United States Patent [19]
Dietzen et al.

[11] 3,949,998
[45] Apr. 13, 1976

[54] TOOL CHUCK
[75] Inventors: William H. Dietzen, Fayetteville, N.C.; Stephen J. Ehrlich, Owings Mills, Md.
[73] Assignee: The Black and Decker Manufacturing Company, Towson, Md.
[22] Filed: May 2, 1973
[21] Appl. No.: 356,615

Related U.S. Application Data
[63] Continuation of Ser. No. 126,472, March 22, 1971, abandoned.

[52] U.S. Cl. .............................. 279/62; 279/1 ME
[51] Int. Cl.² ........................................ B23B 31/04
[58] Field of Search ............ 279/60, 61, 62, 63, 64, 279/65, 1 K, 1 ME

[56]         References Cited
         UNITED STATES PATENTS
3,162,164    8/1969    Wightman ............................. 279/62
3,810,642    5/1974    Derbyshire ............................ 279/62

FOREIGN PATENTS OR APPLICATIONS
435,216     5/1948    Italy ..................................... 279/62
1,255,450   11/1967   Germany ............................. 279/62

Primary Examiner—Willie G. Abercrombie
Assistant Examiner—Z. R. Bilinsky
Attorney, Agent, or Firm—Joseph R. Slotnik; Edward D. Murphy; Leonard Bloom

[57]         ABSTRACT

A tool chuck for drills and the like including a body having gripping jaws slideably supported in tapered ways formed in the body. A split nut rotatably supported on the body threadedly engages the jaws and is operable to engage and release the jaws from a bit. The nut and body are interfitted to rotatably support and axially retain the nut on the body. A cup is fitted on the nut to hold it together and on the body and, together with the interfitted body and nut, protects the internal chuck parts from dirt and other foreign material.

17 Claims, 4 Drawing Figures

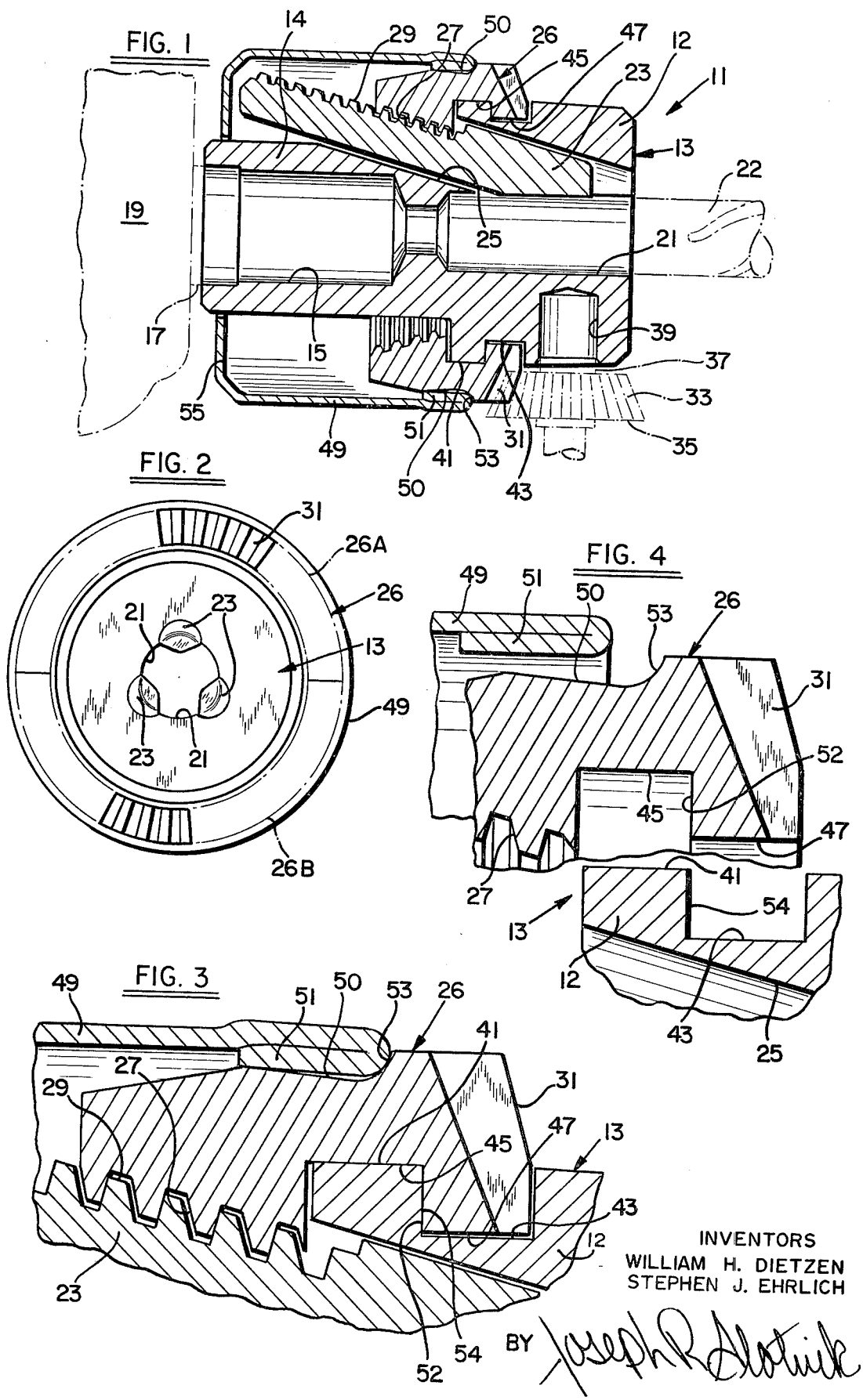

3,949,998

TOOL CHUCK

This is a continuation of application Ser. No. 126,472, filed Mar. 22, 1971, now abandoned.

SUMMARY OF THE INVENTION

The present invention is directed to an improved chuck for use with electric drills and the like, which chuck embodies a novel interfitted gear and body. This construction facilitates the use of smaller stock from which various components, etg. jaws, body, etc. are formed, thereby reducing the materials cost and the cost and time required to machine these parts. In addition to being relatively inexpensive, the chuck of the present invention embodies relatively few parts and is, therefore, light in weight, while being highly accurate and reliable in performance, and possessing long life.

Main objects of the present invention, therefore, are to provide an improved tool chuck, including a body, a plurality of jaws, and a gear, wherein the body and gear are interfitted in a novel manner for accurate rotatable support and axial retention of the gear on the body, which prevents foreign material from gaining access to the interior of the chuck, and which by said interfit facilitates low materials and manufacturing costs.

Further objects of the present invention are to provide an improved chuck of the above character which is relatively light in weight, durable in construction, and reliable and accurate in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a longitudinal section illustrating a tool chuck embodying the present invention;
FIG. 2 is an end view of the construction of FIG. 1;
FIG. 3 is an enlarged view of a portion of FIG. 1; and
FIG. 4 is an exploded view of a portion of FIG. 3.

STATEMENT OF THE INVENTION

Broadly described, the present invention relates to a tool chuck comprising a body having a plurality of ways formed therein, said ways converging toward the front of said body, jaws slideably supported in said ways and having gear teeth formed thereon, a gear rotatably supported on said body and having internal gear teeth threadedly engaging the teeth on said jaws, whereby rotation of said gear is effective to move the jaws longitudinally of said ways, said gear and said body having interfitting means disposed wholly toward the front of said body from said gear teeth preventing axial movement of said gear relative to said body.

In another aspect, the present invention relates to a tool chuck comprising a body having an annular groove formed therein, a gear including a plurality of arcuate segments rotatably supported on said body adjacent said groove and having an annular inturned lip positioned in said annular groove, a plurality of jaws slideably supported on said body and having teeth formed thereon interengaged with teeth formed on said gear, said gear teeth being disposed wholly to one axial side of said groove and lip, whereby rotation of said gear is effective to move said jaws radially of said body into and out of gripping engagement with a bit, a sheet metal cover fitted over said gear segments retaining the integrity of said gear and holding said lip in position in said groove.

In still another aspect, the present invention relates to a tool chuck comprising a body, a gear having bearing surface means rotatably engaging bearing surface means on said body and having means integral therewith interfitted with said body, whereby to axially retain said gear on said body, jaw means slideably supported on said body and movable radially thereof into gripping engagement with a bit, means separate from and axially spaced to one side of said interfitted means operatively interengaging said gear and said jaws means whereby to move said jaw means in response to rotation of said gear on said body, said gear having bevel teeth formed thereon, a pilot opening formed in said body adjacent said gear teeth and operative to support a chuck key, said chuck key having a bevel gear engageable with said first mentioned bevel gear teeth, whereby said chuck key is operative to rotate said gear and move said jaws.

In yet another aspect, the present invention includes a chuck comprising an integral body having a large diameter front portion and a reduced diameter rear portion adapted to be connected to a shaft, a plurality of jaws slideably supported in converging ways in the front portion of said body, a split gear rotatably supported upon and axially interfitted with said body at its front portion only, said gear having a portion adjacent said body rear portion only provided with gear teeth thereon engaging teeth on said jaws, means supported and retained solely on said gear maintaining the integrity of said gear and insuring rotatable support and axial retention on said body, radial pilot opening means in said body forwardly of said gear and adapted to receive a pilot formed on a key, said key having gear teeth engageable with gear teeth on said gear at the forward end thereof, whereby said key is effective to turn said gear and move said jaws along said ways.

In yet another aspect, the present invention relates to a tool chuck comprising a body, a split gear rotatable on said body and having means interengaged with means on said body to retain said gear against axial movement relative to said body, a plurality of jaws slidably supported on said body and having teeth formed thereon interengaged with teeth formed on said gear, whereby rotation of said gear is effective to move said jaws radially of said body into and out of gripping engagement with a tool bit, a relatively thin, sheet metal cover having one end fitted over said split gear retaining the integrity of said gear and the interengagement of said gear on said body, said sheet metal cover one end being folded on itself forming a double thickness material at the area of engagement with said split gear.

In yet another aspect, the present invention relates to a tool chuck comprising a body, a split gear rotatable on said body and having means interengaged with means on said body to retain said gear against axial movement relative to said body, a plurality of jaws slidably supported on said body and having teeth formed thereon interengaged with teeth formed on said gear, whereby rotation of said gear is effective to move said jaws radially of said body and into and out of gripping engagement with a tool bit, said gear having an annular surface tapered inwardly toward the front of said chuck, a relatively thin, sheet metal cover disposed rearwardly of said split gear and having its forward end fitted over said tapered annular surface in interferring relation therewith retaining the integrity of said gear and the interengagement of said gear on said body, said sheet metal cover forward end being folded on itself forming a double thickness material at the area of engagement with said split gear.

In yet another aspect, the present invention relates to a tool chuck comprising a body having a plurality of ways formed therein, said ways converging toward the front of said body, jaws slidably supported in said ways and having gear teeth formed thereon, a gear rotatably supported on said body and having internal gear teeth threadedly engaging the teeth on said jaws, whereby rotation of said gear is effective to move said jaws longitudinally of said ways, said gear and said body having interfitting means disposed wholly toward the front of said body from said gear teeth preventing axial movement of said gear relative to said body, a relatively thin, sheet metal cover having one end fitted over said split gear retaining the integrity of said gear and the interfitting relationship between said gear and said body, said sheet metal cover one end being folded on itself forming a double thickness material at the area of engagement with said split gear.

DETAILED DESCRIPTION

Referring now more specifically to the drawings, a tool chuck embodying the present invention is illustrated generally at 11 in FIG. 1 and is seen to include a body 13 having a relatively large diameter front portion 12 and a relatively small diameter rear portion 14, the latter having a central threaded opening 15 receiving an output threaded spindle 17 of a tool 19, for example, an electric drill. The body 13 has a bore 21 in its front portion 12 adapted to receive a bit 22, for example, a drill bit. A plurality of jaws 23 are slideably disposed in tapered, converging ways 25 formed in the body 13 and are movable into gripping engagement with the bit 22 disposed in the bore 21.

A gear 25 is rotatably supported on the body 13 and has internal gear teeth 27 cooperatively engageable with teeth 29 formed on the jaws 23. Thus, when the gear 26 is rotated on the body 13, the jaws 23 are caused to move longitudinally in the ways 25 and either into or out of converging relationship to grip or release the bit 22 disposed in the bore. The direction the jaws 23 move is, of course, dependent upon the direction the gear 26 is rotated. The gear 26 has bevel teeth 31 formed on its forward end which are cooperatively interengageable with bevel gear teeth 33 formed on a chuck key 35 operable to turn the gear 26. The key 35 has a pilot 37 rotatably receivable in a radial pilot opening 39 formed in the body 13 adjacent the gear teeth 31.

In accordance with the present invention, the gear 26 is rotatably supported upon and interfitted with the body 13 in a manner adapted to accurately support the gear 26 thereon and retain it against axial movement relative thereto. Thus, as seen in the figures, the front portion 12 of the body 13 is provided with an annular bearing surface 41 and has an annular groove 43 formed therein and adjacent the surface 41. The gear 26, as shown, includes a plurality of arcuate segments, here, two semi-cylindrical segments 26a, 26b, which together define an internal peripheral bearing surface 45 adjacent the surface 41. The gear 26 also includes an annular inturned lip 47 formed adjacent the surface 45 and adapted to fit in the groove 43. The gear 26 and body 13 have engageable radial bearing surfaces 52, 54, respectively. A cover 49 fits on an annular surface 50 formed on the gear segments 26a 26b, and seats against a shoulder 53 thereon. This cover 49 maintains the integrity of the gear 26 and holds the annular lip 47 in the annular groove 43.

Since the cover 49 is utilized only to main the integrity of the gear 26, and to act as a dirt guard, as will be described, it can be light weight and can, if desired, be constructed of drawn, relatively thin, sheet metal. If so constructed, the cover 49 may have a double thickness 51 in the area where it engages the surface 50 on the gear segments 26a, 26b. Also, the surface 50 may be tapered, as shown, while having an interference fit with the cover 49 along at least a major portion of surface 50, to help prevent the cover 49 from pulling off the gear 26 in use.

It will be appreciated that annular bearing surfaces 41, 45, and radial bearing surfaces 54, 52 accurately support the gear 26 on the body 13, and the interengaged lip 47 and groove 43 in the gear 26 and body 13, respectively, function to axially retain the gear 26 in place on the body 13. Further, this interfitted lip and groove serves to prevent dirt and other foreign material from gaining access to the interior of the chuck 11 where it could inhibit performance of the internal parts. In addition, the cover 49 desirably has a radially inwardly extending rear wall 55 closely surrounding the rear portion 14 of the chuck body 13 to prevent dirt or other foreign matter from entering the chuck 11 at this area.

Also, the construction of the present invention is distinguished from many prior art versions which utilize a body having a relatively large diameter, radial flange behind the gear to axially retain the gear in place. These prior art constructions generally require a relatively large size piece of stock to form the body (i.e., one having a diameter at least the size of the radial flange), which, of course, contributes to the overall cost of the chuck. This is so since the chuck body made from the larger stock is more expensive and requires more machining than a chuck body made from smaller stock as in that of the present invention.

Furthermore, the interfitted and supporting relationship of the gear 26 on the body 13 renders the chuck parts very stable and accurate in performance. The cover 49 functions only to maintain the integrity of the gear 49 and as a dust shield at the rear end of the chuck 11.

By the foregoing, there has been disclosed an improved tool chuck calculated to fulfill the inventive objects hereinabove set forth, and while a preferred embodiment has been illustrated and described in detail, various additions, substitutions, modifications, and omissions may be made thereto without departing from the spirit of the invention.

I claim:

1. A tool chuck comprising a body having a plurality of ways formed therein, said ways converging toward the front of said body, jaws slideably supported in said ways and having gear teeth formed thereon, a gear rotatably supported on said body and having internal gear teeth threadedly engaging the teeth on said jaws, whereby rotation of said gear is effective to move the jaws longitudinally of said ways, said gear and said body having interfitting means disposed wholly toward the front of said body from said internal gear teeth preventing axial movement of said gear relative to said body.

2. A chuck as described in claim 1 wherein said gear includes a plurality of separable arcuate segments together defining an annular member, and a cover fitting over said segments and maintaining the intergrity of said annular gear member.

3. A chuck as defined in claim 2 wherein said cover has an inturned rear wall closely surrounding said body and forming therewith a dust guard.

4. A chuck as defined in claim 1 wherein said interfitting means includes interengageable annular surfaces on said gear and body which both rotatably support said gear on said body and prevent substantial axial relative movement therebetween.

5. A chuck as defined in claim 4 wherein said body has an annular recess, said gear having an annular lip generally complementary to said recess.

6. A chuck as defined in claim 1 wherein said body includes a relatively large diameter front portion and a relatively small diameter rear portion, said gear being supported upon and interfitted with said body at said front portion and engaging said jaws at said rear portion.

7. A chuck as defined in claim 6 wherein said gear includes individual arcuate segments interfitted with said body, and a cover encompassing said segments and maintaining the integrity of said gear, said cover having an inturned wall closely surrounding said body rear portion.

8. A chuck comprising an integral body having a large diameter front portion only and a reduced diameter rear portion adapted to be connected to a shaft, a plurality of jaws slideably supported in converging ways in the front portion of said body, a split gear rotatably supported upon and axially interfitted with said body at its front portion only, said gear having a portion adjacent said body rear portion only provided with gear teeth thereon engaging teeth on said jaws, means supported and retained solely on said gear maintaining the integrity of said gear and insuring rotatable support and axial retention on said body, radial pilot opening means in said body forwardly of said gear and adapted to receive a pilot formed on a key, said key having gear teeth engageable with gear teeth on said gear at the forward end thereof, whereby said key is effective to turn said gear and move said jaws along said ways.

9. A chuck as defined in claim 8 wherein said gear and said body include interengaged annular surfaces rotatably supporting said gear on said body, said maintaining means including a cover fitted over said gear.

10. A tool chuck comprising a body having an annular groove formed therein, a gear including a plurality of arcuate segments rotatably supported on said body adjacent said groove and having an annular inturned lip positioned in said annular groove, a plurality of jaws slidably supported on said body and having teeth formed thereon interengaged with teeth formed on said gear, said gear teeth being disposed wholly to one axial side of said groove and lip, whereby rotation of said gear is effective to move said jaws radially of said body into and out of gripping engagement with a bit, a sheet metal cover fitted over said gear segments retaining the integrity of said gear and holding said lip in position in said groove.

11. A chuck as defined in claim 10 wherein said gear segments include an annular surface receiving said cover in interfering relation, said surface being tapered inwardly of said body in the direction of assembly of said cover, whereby to prevent withdrawal of said cover after assembly.

12. A tool chuck comprising a body, a gear having bearing surface means rotatably engaging bearing surface means on said body and having means integral therewith interfitted with said body, whereby to axially retain said gear on said body, jaw means slidably supported on said body and movable radially thereof into gripping engagement with a bit, means separate from and axially spaced to one side of said interfitted means operatively interengaging said gear and said jaw means whereby to move said jaw means in response to rotation of said gear on said body, said gear having bevel teeth formed thereon, a pilot opening formed in said body adjacent said gear teeth and operative to support a chuck key, said chuck key having a bevel gear engageable with said first mentioned bevel gear teeth, whereby said chuck key is operative to rotate said gear and move said jaws.

13. A tool chuck comprising a body, a split gear rotatable on said body and having means interengaged with means on said body to retain said gear against axial movement relative to said body, a plurality of jaws slidably supported on said body and having teeth formed thereon interengaged with teeth formed on said gear, whereby rotation of said gear is effective to move said jaws radially of said body into and out of gripping engagement with a tool bit, a relatively thin, sheet metal cover having one end fitted over said split gear retaining the integrity of said gear and the interengagement of said gear on said body, said sheet metal cover having one end being folded on itself forming a double thickness material at the area of engagement with said split gear.

14. A tool chuck comprising a body, a split gear rotatable on said body and having means interengaged with means on said body to retain said gear against axial movement relative to said body, a plurality of jaws slidably supported on said body and having teeth formed thereon interengaged with teeth formed on said gear, whereby rotation of said gear is effective to move said jaws radially of said body into and out of gripping engagement with a tool bit, said gear having an annular surface tapered inwardly toward the front of said chuck, a relatively thin, sheet metal cover disposed rearwardly of said split gear and having its forward end fitted over said tapered annular surface in interferring relation therewith retaining the integrity of said gear and the interengagement of said gear on said body, said sheet metal cover forward end being folded on itself forming a double thickness material at the area of engagement with said split gear.

15. A tool chuck comprising a body having a plurality of ways formed therein, said ways converging toward the front of said body, jaws slidably supported in said ways and having gear teeth formed thereon, a gear rotatably supported on said body and having internal gear teeth threadedly engaging the teeth on said jaws, whereby roatation of said gear is effective to move the jaws longitudinally of said ways, said gear and said body having interferring means disposed wholly toward the front of said body from said internal gear teeth preventing axial movement of said gear relative to said body, a relatively thin, sheet metal cover having one end fitted over said split gear retaining the intergrity of said gear and the interfitting relationship of said gear and said body, said sheet metal cover having one end being folded on itself forming a double thickness material at the area of engagement with said split gear.

16. A tool chuck comprising a body having an annular groove formed therein, a gear including a plurality of arcuate segments rotatably supported on said body adjacent said groove and having an annular inturned lip positioned in said annular groove, a plurality of jaws slidably supported on said body and having teeth formed thereon interengaged with teeth formed on said gear, said gear teeth being disposed wholly to one axial side of said groove and lip, whereby rotation of said gear is effective to move said jaws radially of said body into and out of gripping engagement with a bit, a sheet metal cover fitted over said gear segments retaining the integrity of said gear and holding said lip in position in said groove, said sheet metal cover having one end folded on itself to form a double thickness of material at the area of engagement with said split gear.

17. A tool chuck comprising a body having a plurality of ways formed therein, said ways converging toward the front of said body, jaws slidably supported in said ways and having gear teeth formed thereon, a gear rotatably supported on said body and having internal gear teeth threadedly engaging the teeth on said jaws, whereby rotation of said gear is effective to move the jaws longitudinally of said ways, said gear and said body having interfitting means disposed wholly toward the front of said body from said gear teeth preventing axial movement of said gear relative to said body, said gear having an external circumferential surface thereon, said surface being tapered radially inwardly toward the front of said chuck, a sheet metal cover fitted over said gear and holding said gear on said body, said cover comprising a folded forward end and a cylindrical rearward portion, said folded end being interferingly engaged with said tapered surface.

* * * * *